United States Patent [19]
Mc Shane, Jr.

[11] B 3,925,334

[45] Dec. 9, 1975

[54] PROCESS FOR PREPARING ETHYLENE/PROPYLENE/1,4-HEXADIENE ELASTOMERIC TERPOLYMERS USING CATALYST PREPARED IN A WIPED-WALL CATALYST PREMIXER

[75] Inventor: Herbert Felix Mc Shane, Jr., Wilmington, Del.

[73] Assignee: E. I. du Pont de Nemours and Company, Wilmington, Del.

[22] Filed: Mar. 19, 1973

[21] Appl. No.: 342,423

[44] Published under the Trial Voluntary Protest Program on January 28, 1975 as document no. B 342,423.

[52] U.S. Cl............ 260/80.78; 23/286; 260/94.9 P; 260/95 R; 260/95 C
[51] Int. Cl.²... C08F 2/06; C08F 4/68; C08F 36/20
[58] Field of Search....... 260/80.78, 94.9 B, 88.2 R, 260/88.2 B, 80 C, 88.2 E, 95 R, 95 C, 94.9 P; 23/285, 286

[56] References Cited
UNITED STATES PATENTS

| | | | |
|---|---|---|---|
| 3,072,464 | 1/1963 | Akaboshi et al. | 260/95 C |
| 3,205,216 | 9/1965 | McManimie et al. | 260/94.9 B |
| 3,341,503 | 9/1967 | Paige et al. | 260/80.78 |
| 3,354,136 | 11/1967 | Crawford | 260/93.5 R |
| 3,469,948 | 9/1969 | Anderson et al. | 260/94.9 B |
| 3,534,007 | 10/1970 | Hoffman, Jr. et al. | 260/80.78 |
| 3,600,364 | 8/1971 | Mirza et al. | 260/80.78 |
| 3,635,919 | 1/1972 | Goffinet Jr. | 260/88.2 R |
| 3,637,616 | 1/1972 | Peterson | 260/88.2 R |
| 3,681,307 | 8/1972 | Wismer et al. | 260/80.78 |
| 3,681,308 | 8/1972 | Irvin et al. | 260/80.78 |
| 3,706,719 | 12/1972 | Goffinet Jr. | 260/80.78 |

*Primary Examiner*—Joseph L. Schofer

[57] ABSTRACT

In a continuous process for the solution polymerization of ethylene, propylene, and 1,4-hexadiene monomers in a reactor and in the presence of a coordination catalyst prepared from $VOCl_3$ and $R_xAlCl_{3-x}$, where R is a $C_4$ to $C_{12}$ and is an alkyl group having a $\beta$-alkyl substituent and $x$ is about 1.6 to 2.0, the improvement wherein $VOCl_3$ and $R_x AlCl_{3-x}$ are premixed in solvent in a wiped-wall catalyst premixer to prepare catalyst solution having an aluminum to vanadium atomic ratio of about 1.6 to 2.8 and a concentration of about 20 to 50 millimoles vanadium per liter of solvent, and continuously injecting the resulting premixed catalyst into the reactor. Polymer prepared thereby has improved rheological properties.

17 Claims, 2 Drawing Figures

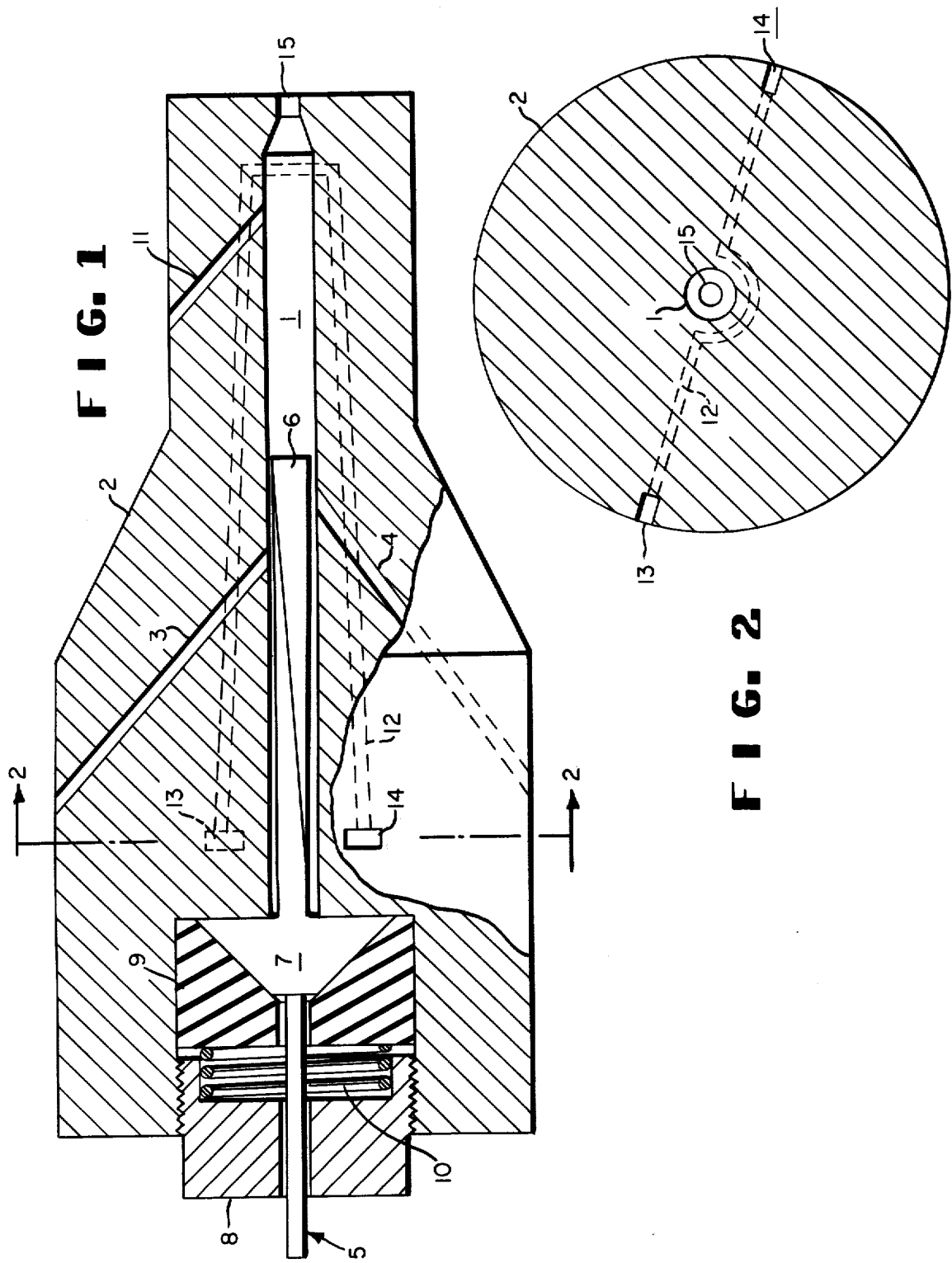

3,925,334

PROCESS FOR PREPARING ETHYLENE/PROPYLENE/1,4-HEXADIENE ELASTOMERIC TERPOLYMERS USING CATALYST PREPARED IN A WIPED-WALL CATALYST PREMIXER

BACKGROUND OF THE INVENTION

This invention relates to the preparation of elastomeric terpolymers of ethylene, propylene, and 1,4-hexadiene having improved rheological properties.

Copolymerization of ethylene, propylene, and 1,4-hexadiene monomers in solvent and in the presence of a coordination catalyst to form elastomeric terpolymers is well known in the art. The terpolymer is conventionally recovered from solution, compounded with additives such as curing agents, inert fillers and antioxidants, and vulcanized to form an elastomeric product.

Compounding of elastomeric copolymers and additives is generally accomplished on a rubber mill. Behavior of an elastomeric copolymer during milling is temperature dependent and is commonly described in terms of four milling regions with the mill temperature, on the opposite roll, increasing from region 1 to 4.

Region 1 is defined as milling wherein the elastomer forms a nervy wedge at the roll nip with only strands passing through the nip. Elastomers cannot be successfully milled in region 1.

In region 2 milling, the elastomer forms a tight band on the slow roll of the mill. Typical mill temperatures, on the opposite roll, are about 40° to 56°C. when milling 98 g polymer on a 4 × 8 inch mill with a 30 mil nip.

In region 3 milling, the elastomer hangs from the mill roll forming a loose "band" and may crumble. Very poor processing occurs in region 3, and mill temperatures within this range are generally avoided. The transition temperature between regions 2 and 3, at which a loose band begins to form, is commonly called the "bag-off" temperature. A typical bag-off temperature for ethylene/propylene/1,4-hexadiene terpolymer heretofore made by solution polymerization using $VOCl_3/R_xAlCl_{3-x}$ coordination catalyst is about 56°C. when milling 98 g polymer on a 4 × 8 inch mill with a 30 mil nip.

In region 4 milling, the elastomer is a fluid with viscoelastic properties and generally adheres to the slow mill roll. Practically all copolymers are successfully milled in this range.

Temperature ranges corresponding to milling regions 1 to 4, under standard testing conditions, vary with the particular elastomer which in turn depends on the specific coordination catalyst selected in preparing the elastomer and on catalyst concentration in the premixer.

Elastomeric copolymers of ethylene, propylene, and 1,4-hexadiene heretofore prepared using catalysts described herein can be successfully milled in regions 2 and 4. Close temperature control has been necessary, however, to keep mill temperatures from entering region 3. Temperature control has not been entirely successful and the mill has had to be periodically stopped when region 3 milling conditions have been experienced.

SUMMARY OF THE INVENTION

It has now been discovered that elastomeric copolymers of ethylene, propylene, and 1,4-hexadiene having improved rheological properties are prepared when the conventional catalyst components $VOCl_3$ and $R_xAlCl_{3-x}$, where R is a $C_4$ to $C_{12}$ and is an alkyl group having a $\beta$-alkyl substituent and X is 1.6 to 2.0, are premixed in solvent in a wiped-wall catalyst premixer to prepare catalyst solution having an aluminum to vanadium atomic ratio of about 1.6 to 2.8 and a concentration of about 20 to 50 millimoles vanadium per liter of solvent, and the premixed catalyst solution is injected into the polymerization reactor. In a preferred embodiment the aluminum catalyst component is diisobutyl aluminum chloride.

Elastomeric copolymer thereby prepared has a higher bag-off temperature than similar copolymer prepared using prior art catalyst, and in many cases makes transition from region 2 to region 4 milling without exhibiting poor processing characteristics of region 3 milling.

BRIEF DESCRIPTION OF THE DRAWINGS

FIG. 1 is a longitudinal section of a preferred catalyst premixer.

FIG. 2 is a cross section of the preferred catalyst premixer of FIG. 1 showing cooling channels located in the premixer housing.

DESCRIPTION OF THE INVENTION

It is well known in the art to copolymerize ethylene, propylene, and 1,4-hexadiene monomers in solution and in the presence of a coordination catalyst of $VOCl_3$ and $R_xAlCl_{3-x}$ to prepare elastomeric copolymer. The copolymerization reaction may be conducted in a liquid full reactor or may be conducted in a partially filled reactor having a liquid and a vapor phase with recycle of the vapor phase through a cooling loop to remove the exothermal heat of reaction. Generally, the reactor is maintained at a temperature of about −20° to 80°C., and preferably about 20° to 60°C. U.S. Pat. Nos. 3,635,919 and 3,637,616 describe typical processes.

It has now been found that polymer having improved rheological properties is prepared when the catalyst components $VOCl_3$ and $R_xAlCl_{3-x}$ are premixed in solvent in a wiped-wall catalyst premixer to prepare catalyst solution having an aluminum to vanadium atomic ratio of about 1.6 to 2.8 and a concentration of about 20 to 50 millimoles vanadium per liter of solvent. By "improved rheological properties" is meant that polymer so prepared will have a higher bag-off temperature, and more preferably not exhibit region 3 milling characteristics, than polymer prepared using the prior art catalyst.

In practicing the invention, the aluminum component will have the formula $R_xAlCl_{3-x}$ where R is a $C_4$ to $C_{12}$ and is an alkyl group having a $\beta$-alkyl substituent. Generally, the $\beta$-alkyl substituent is lower alkyl, such as methyl or ethyl, and x is number from about 1.6 to about 2.0. When the aluminum component is diisobutyl aluminum chloride, which is preferred, and the solvent is hexane, especially favorable results are obtained using catalyst solution having an aluminum to vanadium atomic ratio of about 1.65 to about 1.71 and a catalyst concentration of about 25 to about 40 millimoles vanadium per liter of hexane.

Referring to FIG. 1, a particularly preferred catalyst premixer has a mixing chamber 1 provided within catalyst premixer housing 2. The mixing chamber has a circular cross section and defines a right cylinder. Also provided in the housing are channels 3 and 4 which communicate with the mixing chamber for the introduction, respectively, of catalyst components $VOCl_3$ and $R_xAlCl_{3-x}$.

A stirring rod 5 is provided having a mixing blade 6 essentially in the shape of a helical flight and having a flange 7 shaped to seat in a recessed opening in the mixer housing. The recessed opening is of circular cross section, communicates with the mixing chamber, and is coaxial therewith.

The stirring rod is rotatably positioned in the mixing chamber coaxial therewith by means of locknut 8. Leakage from the mixing chamber is prevented by means of a sealing ring 9 held against the stirring rod flange and walls of the recessed opening by means of spring element 10. Means are provided (not shown) to rotate the stirring rod. Mixing blade 6 has a diameter slightly smaller than that of the mixing chamber so that the chamber walls are wiped as the rod rotates to mix catalyst components introduced through channels 3 and 4.

Mixed catalyst solution exits the mixing chamber through restricted passageway 15 and then enters the reactor (not shown). The restricted passageway is provided to increase the speed of exiting catalyst solution thus preventing appreciable back-mixing of monomers into the mixing chamber and polymerization therein which would plug the catalyst premixer. Also provided is a channel 11 for the injection of solvent to flush premixed catalyst through the restricted passageway to assist in preventing back-mixing of monomers into the mixing chamber. Depending on the rate of premixing and cross section of the particular premixer, the restricted passageway and channel 11 may not be necessary for proper operation of the catalyst premixer.

Referring to FIGS. 1 and 2, a cooling channel 12 is provided in the premixer housing having a coolant inlet port 13 and outlet port 14. Coolant is circulated through the cooling channel during operation of the premixer to maintain temperatures in the mixing chamber at about −10° to about −55°C. Cooling thereby provided prevents undue catalyst decay and precipitation of inorganic materials.

Selection of a helical shaped mixing blade, as shown in FIG. 1, has been found to prepare copolymer with especially favorable rheological properties. Mixing blades having other configurations, such as triangular or square cross section, have also been found to be useful but give a lesser improvement.

Self-wiping catalyst premixers are also preferred. In a self-wiping premixer two or more mixing blades are mounted to wipe both the premixer walls and surfaces of companion mixing blades.

In addition to favorable milling properties, copolymer prepared using the premixed catalyst solution also exhibits a higher shear rate at a given shear stress than copolymer prepared in a conventional copolymerization process; thus, the copolymer is an excellent candidate for extrusion or piston fed injection molding.

Copolymer prepared using the premixed catalyst solution is cured in a conventional manner, such as with the usual sulfur or peroxide curing systems, to prepare elastomeric articles such as gaskets and radiator hoses.

The invention will now be further described with respect to copolymerization of ethylene, propylene, and 1,4-hexadiene in a reactor using catalyst mixed in the preferred premixer of the Drawings. All parts and percentages are by weight unless otherwise indicated.

While not used in the example, small amounts of hydrogen diluted with ethylene can be used as desired to reduce polymer molecular weight.

EXAMPLE

A. Equipment

1. Reactor — A 4 liter reactor was assembled from a section of 6 inch (i.d.) glass pipe [modified by the addition of an overflow side leg of 1 inch (i.d.) glass pipe] and stainless steel top and bottom plates. The top plate bore an air motor and a packing gland centrally mounted and to one side an exit port for reactor off-gases. The bottom plate was fitted in the center with a recessed bronze bushing to help align the stirring shaft which enabled the air motor to power a 4.5 inch vaned disc agitator, and threaded holes for thermocouple, monomer inlet, and premixer inlet. The bottom plate was externally fitted with a metal coil for heating and cooling.

The reactor hold volume was controlled at 2 liters by inserting a hexane bubbler in the off-gas line and thus creating a (variable) back pressure on the liquid forcing it to overflow and be removed through a pressure let-down device. Temperature control was obtained by varying the heating or cooling on the bottom plate coil and by varying the degree to which the solvent fed to the reactor was cooled below room temperature.

2. Catalyst Premixer — Referring to FIG. 1, a mechanical catalyst premixer is used having a housing 2 with a longitudinal length of about 8.4 cm. The mixing chamber 1 is of circular cross section, has a diameter of about 0.635 cm., and has an overall length of about 5.9 cm. including restricted passageway 10 which has a diameter of about 0.318 cm. Two channels 11 are provided just inside the restricted passageway for hexane flushing. Channels 3 and 4 of about 0.08 cm. diameter are provided for the separate introduction of $VOCl_3$ and diisobutyl aluminum chloride catalyst components.

Mixing rod 5 has a mixing blade 6 which projects about 3.56 cm. into the mixing chamber. The blade has a chrome plating to increase surface hardness and is in the shape of a helical flight having a diameter of 0.625 cm. Clearance between the blade and the mixing chamber walls is about 0.01 cm. to provide continuous wiping as the blade is rotated.

The premixer was mounted on the reactor using the threaded hole of the reactor bottom plate. When assembled, the premixer exit was approximately flush with the inside bottom surface of the reactor.

B. Catalyst Premixing and Polymerization

The reactor was operated on a one pass basis without recycle and was maintained at 40° to 50°C. and 60 psig. The reactor and all streams leading to it were dried and deoxygenated. The reactor was filled with about one liter of solvent to allow proper functioning of the agitator and then the run was started in the following manner.

The catalyst premixer was maintained at about −20°C. by continuously circulating acetone refrigerant through cooling channel 12 in the reactor housing. The premixer stirring rod was rotated at 3000 rpm. Diisobutyl aluminum chloride (DIBAC) was fed to the cold premixer as a solution of 350 micromoles of DIBAC per ml of hexane at a rate of 1.32 ml solution per minute, for a DIBAC feed of 462 micromoles per minute. Hexane was fed to the premixer tip flush at a rate of 69 ml per minute.

Then gaseous propylene was fed to the reactor at the rate of 420 millimoles per minute; and liquid 1,4-hexadiene was fed to the reactor as a solution of 4.2 ml 1,4-hexadiene in 17.4 ml hexane, at a rate of 4.2 ml 1,4-hexadiene per minute. Five minutes later VOCl₃ flow was established to the premixer as a hexane solution containing 197 micromoles VOCl₃ per ml of solution at a rate of 1.40 ml solution per minute, for a VOCl₃ feed of 276 micromoles per minute. This solution was diluted in a Tee mixer before reaching the premixer by an additional 7.53 ml/minute of hexane.

Twenty minutes later ethylene was fed at reduced rate to the reactor. The ethylene feed was slowly increased over a 1-hour period to 119 millimoles per minute. Polymer solution produced for the next 2 hours was discarded and then collection of steady state product was begun.

At steady state the average residence time in the reactor was typically 20 minutes. At steady state, residence time in the catalyst premixer is about 10 seconds; and the premixed catalyst had an aluminum to vanadium atomic ratio of about 1.68 and a concentration of 27 millimoles vanadium per liter of solution. Catalyst concentration in the reactor was about 2.7 millimolal.

Polymer solution was withdrawn from the rector at the rate of 6 liters per hour and acid water washed to remove catalyst residues. Polymer was recovered from solution by evaporation yielding about 0.23 kilograms of polymer per hour.

Recovered polymer had a Wallace Plasticity of 32, an inherent viscosity of 2.69, and did not undergo Region 3 milling under standard test conditions of milling 96 grams polymer on a 4 × 8 inch mill with a 30 mil nip. The region 4 transition temperature was 98°C.

Polymer prepared in a similar manner having a Wallace Plasticity of 53 and an inherent viscosity of 2.98 likewise did not bag-off the mill under standard test conditions. A third polymer prepared using catalyst having an aluminum to vanadium atomic ratio of 2.8 had a Wallace Plasticity of 29, an inherent viscosity of 2.28, and likewise did not bag-off the mill under standard test conditions. For comparison, polymer prepared using conventional premixed catalyst, and having a Wallace Plasticity of 43 and an inherent viscosity of 2.84, bags-off the mill at 57°C. under standard test conditions.

What is claimed is:

1. In a continuous process for the solution interpolymerization of ethylene, propylene, and 1,4-hexadiene monomers in the reactor and in the presence of a coordination catalyst prepared from VOCl₃ and $R_xAlCl_{3-x}$, where R is a $C_4$ to $C_{12}$ and is an alkyl group having a β-alkyl substituent and x is about 1.6 to 2.0, the improvement wherein VOCl₃ and $R_xAlCl_{3-x}$ are continuously premixed in solvent in the absence of monomer in a wiped-wall catalyst premixer to prepare catalyst solution having an aluminum to vanadium atomic ratio of about 1.6 to 2.8 and a concentration of about 20 to 50 millimoles vanadium per liter of solvent, and the premixed catalyst solution is continuously injected into the reactor as it is formed.

2. The process of claim 1 wherein the catalyst premixer is also self wiping.

3. The process of claim 1 wherein VOCl₃ and (i-butyl)$_x$AlCl$_{3-x}$ are premixed in hexane solvent.

4. The process of claim 3 wherein the premixed catalyst solution has a concentration of about 25 to 40 millimoles vanadium per liter of hexane.

5. The process of claim 4 wherein the aluminum catalyst component is diisobutyl aluminum chloride.

6. The process of claim 5 wherein the premixed catalyst solution has an aluminum to vanadium atomic ratio of about 1.65 to about 1.71.

7. The process of claim 3 wherein residence time in the catalyst premixer is about 10 seconds.

8. The process of claim 3 wherein catalyst solution in the catalyst premixer is at about −10° to about −55°C.

9. The process of claim 1 wherein the wiped-wall catalyst premixer comprises a housing defining a cylindrical mixing chamber, the housing having channels communicating with the mixing chamber for the introduction of VOCl₃ and $R_xAlCl_{3-x}$ separately thereto; and a stirring element rotatably positioned within said mixing chamber, the stirring element having at least one cross-sectional dimension of sufficient size to wipe the mixing chamber walls as the stirring element is rotated.

10. The process of claim 9 wherein the stirring element is in the shape of a helical flight.

11. The process of claim 9 wherein the stirring element is of triangular cross section.

12. The process of claim 9 wherein the stirring element is of square cross section.

13. The process of claim 9 wherein the mixing chamber is cooled to about −10° to −55°C.

14. The process of claim 9 wherein residence time in the mixing chamber is about 10 seconds.

15. The process of claim 9 wherein one end of the mixing chamber is restricted to increase flow speed of catalyst solution from the chamber.

16. The process of claim 9 wherein a channel is provided in the premixer housing for the injection of solvent to flush premixed catalyst from the mixing chamber.

17. The process of claim 9 wherein VOCl₃ and (i-butyl)$_x$AlCl$_{3-x}$ are premixed in hexane at a temperature of about −10° to −55°C. in a catalyst premixer provided with a helical flight stirring element, a mixing chamber with a restricted exit passageway and means to flush catalyst therefrom, residence time in the mixing chamber is about 10 seconds, and the mixing chamber communicates directly with the polymerization reactor.

* * * * *